US007631325B2

(12) United States Patent
Rys et al.

(10) Patent No.: US 7,631,325 B2
(45) Date of Patent: Dec. 8, 2009

(54) SYSTEM AND METHOD OF AUTHORIZING A SET TOP BOX DEVICE IN AN INTERNET PROTOCOL TELEVISION SYSTEM

(75) Inventors: Stephen Rys, Austin, TX (US); Adam Lee Klein, Cedar Park, TX (US); Lee M. Chow, Naperville, IL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 618 days.

(21) Appl. No.: 11/265,785

(22) Filed: Nov. 2, 2005

(65) Prior Publication Data
US 2007/0097860 A1    May 3, 2007

(51) Int. Cl.
*H04N 7/16* (2006.01)
(52) U.S. Cl. ............................. 725/25; 725/27; 725/30; 725/31; 725/151
(58) Field of Classification Search .................... 725/1, 725/2, 5; 709/224, 225, 219
See application file for complete search history.

(56) References Cited

U.S. PATENT DOCUMENTS

| 5,321,750 | A  | * | 6/1994 | Nadan .......................... 380/230 |
| 5,745,884 | A  | * | 4/1998 | Carnegie et al. ............... 705/34 |
| 5,864,604 | A  | * | 1/1999 | Moen et al. .............. 379/114.2 |
| 6,349,289 | B1 | * | 2/2002 | Peterson et al. ................ 705/34 |
| 6,885,660 | B2 | * | 4/2005 | Inbar et al. ................... 370/352 |
| 7,035,410 | B1 |   | 4/2006 | Aiello et al. |
| 7,130,296 | B2 |   | 10/2006 | McNiff et al. |
| 2001/0014615 | A1 | * | 8/2001 | Dahm et al. ................. 455/566 |
| 2001/0052004 | A1 | * | 12/2001 | Stollfus et al. .............. 709/220 |
| 2002/0034179 | A1 | * | 3/2002 | Ollikainen et al. .......... 370/389 |
| 2003/0048380 | A1 | * | 3/2003 | Tamura ...................... 348/552 |
| 2003/0188318 | A1 | * | 10/2003 | Liew et al. ..................... 725/93 |
| 2005/0028206 | A1 |   | 2/2005 | Cameron et al. |
| 2005/0238148 | A1 |   | 10/2005 | Poustchi et al. |
| 2006/0156362 | A1 |   | 7/2006 | Perrot |

OTHER PUBLICATIONS

International Search Report for International Patent No. PCT/US06/38489, mailed on Oct. 17, 2007.
Written Opinion of the International Searching Authority for PCT/US06/38489, mailed on Oct. 17, 2007.

* cited by examiner

*Primary Examiner*—Christopher Kelley
*Assistant Examiner*—Sahar A Baig
(74) *Attorney, Agent, or Firm*—Toler Law Group (57) ABSTRACT

A method of authorizing use of a network device is disclosed and includes receiving an internet protocol (IP) address from the network device and receiving an identification from the network device. The method also includes retrieving information that is associated with an account based on the IP address and determining whether the IP address and the identification are associated with a same account. Further, the method includes allowing service to the network device after determining that the IP address and the identification are associated with the same account.

9 Claims, 9 Drawing Sheets

SYSTEM AND METHOD OF AUTHORIZING A SET TOP BOX DEVICE IN AN INTERNET PROTOCOL TELEVISION SYSTEM

FIELD OF THE DISCLOSURE

The present disclosure relates to set top box devices used in Internet protocol television systems.

BACKGROUND

For years, televisions have been a staple of consumer electronics sales. As such, a large majority of households in the United States owns at least one television. Providing content to those televisions is a lucrative business and there are numerous types of television content to choose from. For example, viewers can subscribe to digital broadband television networks and digital satellite television networks in order to receive standard digital television content or high definition television content.

In many cases, a set top box device is required at a customer location in order to receive television content from a content provider and decode the television content before transmitting the content to a television. For new customers, it may be necessary to manually associate a set top box device with the customer account and location before installing the set top box device at the customer location. Further, each set top box device may only work at an assigned customer location.

In the event that a set top box device is installed at an incorrect customer location, e.g., at a customer location not assigned to the set top box device, the customer would not have service. Also, the content provider would not be able to begin billing the customer for the service. Moreover, some sort of manual intervention, e.g., obtaining the correct set top box or re-assigning the current set top box, would be required before service could be established.

DETAILED DESCRIPTION OF THE DRAWINGS

A method of authorizing use of a network device is disclosed and includes receiving an Internet protocol (IP) address from the network device and receiving an identification from the network device. The method also includes retrieving information that is associated with an account based on the IP address and determining whether the IP address and the identification are associated with a same account. Further, the method includes allowing service to the network device after determining that the IP address and the identification are associated with the same account.

In a particular embodiment, the information associated with the account includes at least one of the following: an account number, an order, and a physical address. Also, in a particular embodiment, the network device is a set top box that is configured to receive television services. Alternatively, the network device is a Voice over IP telephone that is configured to receive telephone services.

In a particular embodiment, the method includes transmitting a power up event to a remote logging module. The power up event can indicate that the network device is authorized. Moreover, the power up event can be logged at a remote logging module with a time and date stamp.

In another particular embodiment, the method includes determining whether an order is pending for the account when the IP address and the identification are not associated with the same account, rejecting the network device, and preventing service to the network device. Further, in a particular embodiment, the method includes determining whether a make and model of the network device match a pending order. The make and model of the network device can be determined at least partially based on the identification received from the network device.

In another embodiment, a method of associating a network device with a network is disclosed and includes requesting an Internet protocol (IP) address from a residential gateway and transmitting an authentication request to the network. The authentication request can include the IP address and an identification associated with the network device. The method also includes receiving a response from the network.

In yet another embodiment, a server is disclosed and includes a memory that is accessible to a processor and a computer program that is embedded within the memory. The computer program includes instructions to receive an Internet protocol (IP) address from the network device, instructions to receive an identification from the network device, instructions to retrieve information associated with an account based on the IP address, instructions to determine whether the IP address and the identification are associated with a same account, and instructions to allow service to the network device after determining that the IP address and the identification are associated with the same account.

In still another embodiment, a network device is disclosed and includes a memory that is accessible to a processor and a computer program that is embedded within the memory. The computer program includes instructions to request an Internet protocol (IP) address from a residential gateway and instructions to transmit an authentication request to the network. The authentication request includes the IP address and an identification associated with the network device. The computer program also includes instructions to receive a response from the network.

Figure 1:
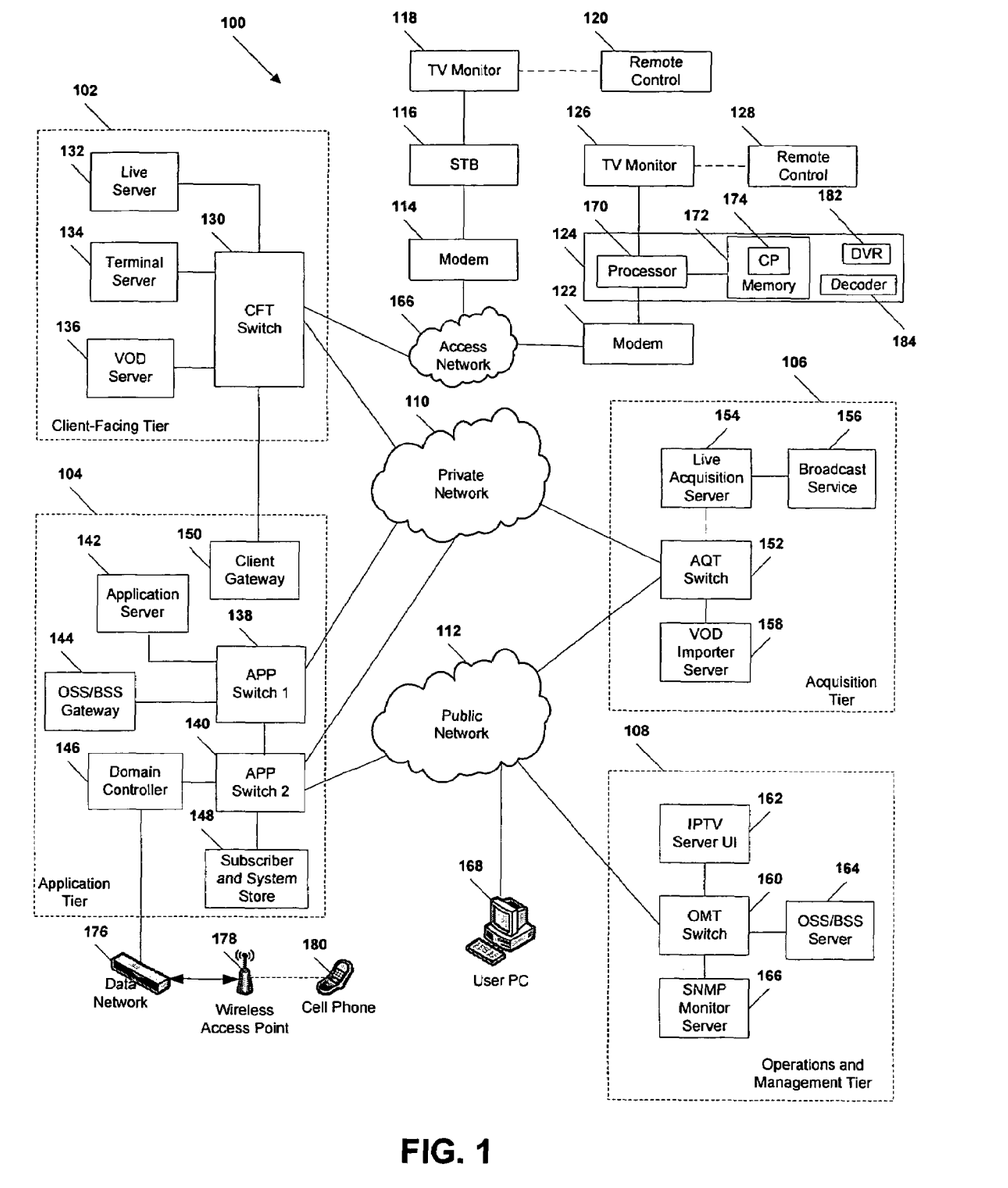
FIG. 1 is a block diagram that illustrates an Internet protocol television (IPTV) system.

Referring to FIG. 1, an Internet protocol television (IPTV) system is shown and is generally designated 100. As shown, the system 100 can include a client facing tier 102, an application tier 104, an acquisition tier 106, and an operations and management tier 108. Each tier 102, 104, 106, 108 is coupled to a private network 110, a public network 112, or both the private network 110 and the public network 112. For example, the client-facing tier 102 can be coupled to the private network 110. Further, the application tier 104 can be coupled to the private network 110 and to the public network 112, such as the Internet. The acquisition tier 106 can also be coupled to the private network 110 and to the public network 112. Moreover, the operations and management tier 108 can be coupled to the public network 112.

As shown in FIG. 1, the various tiers 102, 104, 106, 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

As illustrated in FIG. 1, the client-facing tier 102 can communicate with user equipment via a private access network 166, such as an Internet Protocol Television (IPTV) network. In an illustrative embodiment, modems, such as a first modem 114 and a second modem 122 can be coupled to the private access network 166. The client-facing tier 102 can communicate with a first representative set-top box device 116 via the first modem 114 and with a second representative set-top box device 124 via the second modem 122. The client-facing tier 102 can communicate with a large number of set-top boxes, such as the representative set-top boxes 116, 124, over a wide geographic area, such as a regional area, a metropolitan area, a viewing area, or any other suitable geographic area that can be supported by networking the client-facing tier 102 to numerous set-top box devices.

In a particular embodiment, each modem 114, 122 can be a gateway device, e.g., a residential gateway, that is installed at a customer location. Further, multiple set top boxes can be coupled to a single residential gateway at a customer location.

In one embodiment, the client-facing tier 102 can be coupled to the modems 114, 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each set-top box device 116, 124 can process data received via the private access network 166, via an IPTV software platform, such as Microsoft® TV IPTV Edition.

Additionally, the first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device can communicate with a second remote control 128.

In an exemplary, non-limiting embodiment, each set-top box device 116, 124 can receive data or video from the client-facing tier 102 via the private access network 166 and render or display the data or video at the display device 118, 126 to which it is coupled. In an illustrative embodiment, the set-top box devices 116, 124 can include decoders, such as the decoder 184 shown in FIG. 1, that receive and decode television programming information for transmission to the display devices 118, 126. Further, the set-top box devices 116, 124 can include a STB processor 170 and a STB memory device 172 that is accessible to the STB processor 170. The set-top box device 124 can also include a STB computer program 174 that is embedded within the STB memory device 172. In a particular embodiment, the set-top box devices 116, 124 can also communicate commands received from the remote control devices 120, 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more live servers 132 that store data transmitted in response to user requests, such as video-on-demand material. The CFT switch 130 can also be coupled to a terminal server 134 that provides terminal devices, such as a game application server 168 and other devices with a common connection point to the private network 110. In a particular embodiment, the CFT switch 130 can also be coupled to a video-on-demand (VOD) server 136.

As shown in FIG. 1, the application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an operational support systems/business support systems (OSS/BSS) gateway 144. The application server 142 provides applications to the set-top box devices 116, 124 via the private access network 166, so the set-top box devices 116, 124 can provide functions, such as display, messaging, processing of IPTV data and VOD material, etc. In a particular embodiment, the OSS/BSS gateway 144 includes operational support systems (OSS) data, as well as business support systems and support (BSS) data.

Further, the second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116, 124 can access the system via the private access network 166, using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices from accessing the private network 110, by denying access to these devices beyond the private access network 166.

For example, when a set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the set-top box device 116 access to IPTV content and VOD content. If the client gateway 150 cannot verify subscriber information for the set-top box device 116, e.g., because it is connected to a different twisted pair, the client gateway 150 can deny transmissions to and from the set-top box device 116 beyond the private access network 166.

As indicated in FIG. 1, the acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

FIG. 1 further illustrates that the operations and management tier 108 can include an operations and management tier (OMT) switch 160 that conducts communication between the operations and management tier 108 and the public network 112. In the embodiment illustrated by FIG. 1, the OMT switch 160 is coupled to a IPTV server 162. Additionally, the OMT switch 160 can be coupled to an OSS/BSS server 164 and to a simple network management protocol (SNMP) monitor 166 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 can transmit the television content to the AQT switch 152, in turn, and the AQT switch 152 can transmit the television content to the CFT switch 130 via the private network 110. Further, the television content can be encoded at the live servers 132, and the CFT switch 130 can communicate the television content to the modems 114, 122 via the private access network 166. The set-top box devices 116, 124 can receive the television content from the modems 114, 122, decode the television content, and transmit the content to the display devices 118, 126 according to commands from the remote control devices 120, 128.

Additionally, at the acquisition tier 106, the video-on-demand (VOD) importer server 158 can receive content from one or more VOD sources outside the IPTV system 100, such as movie studios and programmers of non-live content. The VOD importer server 158 can transmit the VOD content to the AQT switch 152, and the AQT switch 152, in turn, can communicate the material to the CFT switch 130 via the private network 110. The VOD content can be stored at one or more servers, such as the VOD server 136.

When a user issues a request for VOD content to a set-top box device 116, 124, the request can be transmitted over the private access network 166 to the VOD server 136, via the CFT switch 130. Upon receiving such a request, the VOD server 136 can retrieve requested VOD content and transmit the content to the set-top box device 116,124 across the private access network 166, via the CFT switch 130.

In an illustrative embodiment, the live acquisition server 154 can transmit the television content to the AQT switch 152, and the AQT switch 152, in turn, can transmit the television content to the OMT switch 160 via the public network 112. In this embodiment, the OMT switch 160 can transmit the television content to the IPTV server 162 for display to users accessing the user interface at the IPTV server 162. For example, a user can access the IPTV server 162 using the computer 168 coupled to the public network 112.

As shown in FIG. 1, the domain controller 146 communicates with the public network. 112 via the second APP switch 140. Additionally, the domain controller 146 can communicate via the public network 112 with one or more user personal computers (PCs) 168. For example, the domain controller 146 can display a web portal via the public network 112 and allow users to access the web portal using a PC 168. Further, in an illustrative embodiment, the domain controller 146 can communicate with at least one wireless network access point 178 over a data network 176. In this embodiment, each wireless network access device 178 can communicate with user wireless devices, such as a cellular phone 180.

Figure 2:
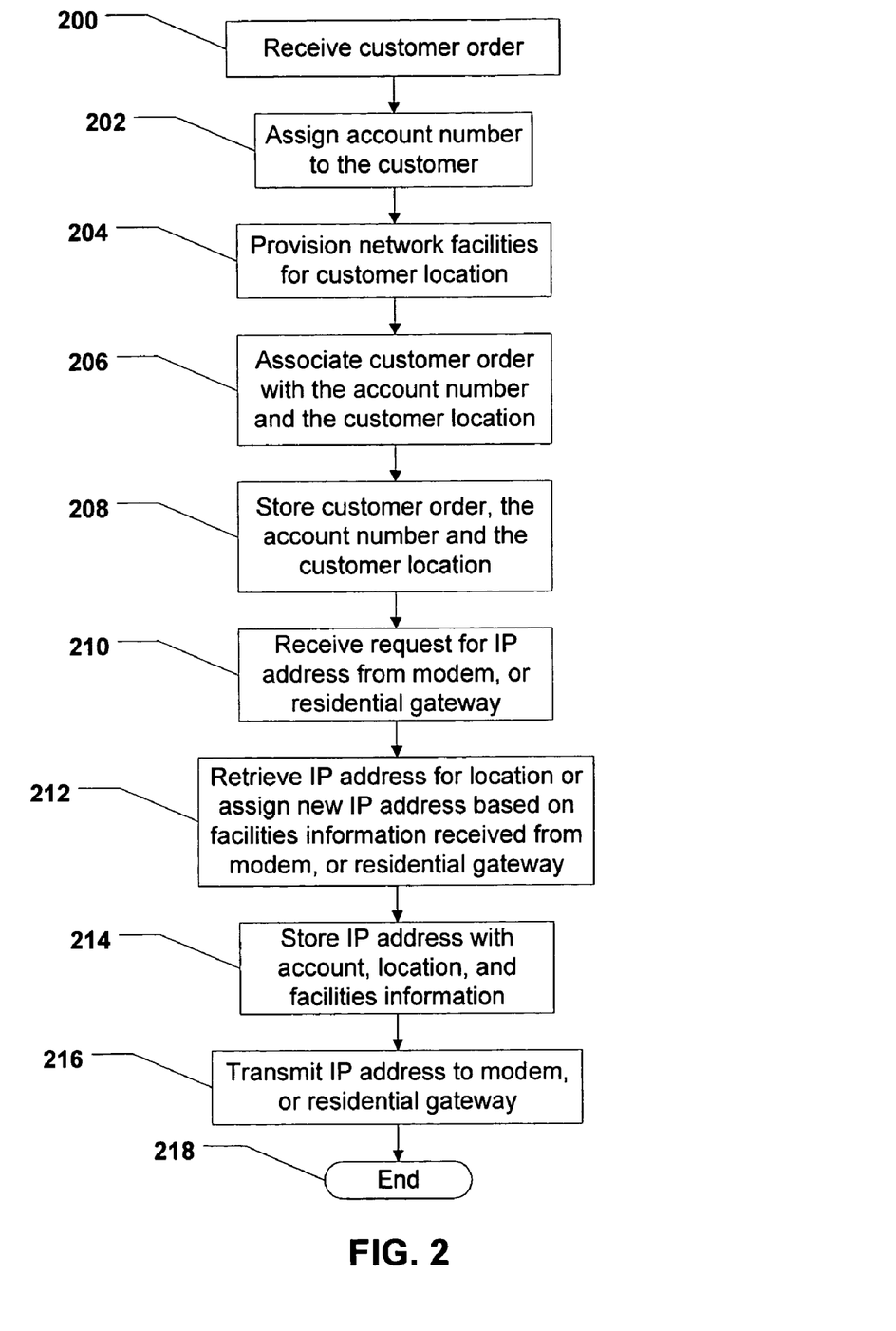
FIG. 2 is a flow chart that illustrates a method of processing customer orders.

Referring to FIG. 2 a method of processing customer orders is shown and commences at block 200. At block 200, a service provider receives a customer order. At block 202, the service provider assigns an account number to the customer. Further, at block 204, the service provider provisions network facilities for customer location. For example, for digital subscriber line (DSL) services the service provider can assign a port number at a DSL access multiplexer (DSLAM) to the customer.

Moving to block 206, the service provider associates the customer order with the account number and the customer location, e.g., the physical address of the customer. At block 208, the service provider stores the customer order, the account number and the customer location.

At block 210, the service provider receives a request for an IP address from modem, or residential gateway. Further, at block 212, the service provider retrieves an IP address for the location of the modem, or residential gateway. Alternatively, the service provider assigns a new IP address based on facilities information received from modem, or residential gateway. In a particular embodiment, the facilities information can include the DSLAM port address that is assigned to the customer. Proceeding to block 214, the service provider stores the IP address with the account, location, and facilities information. At block 216, the service provider transmits the IP address to modem, or residential gateway. The method then ends at state 218.

Figure 3:
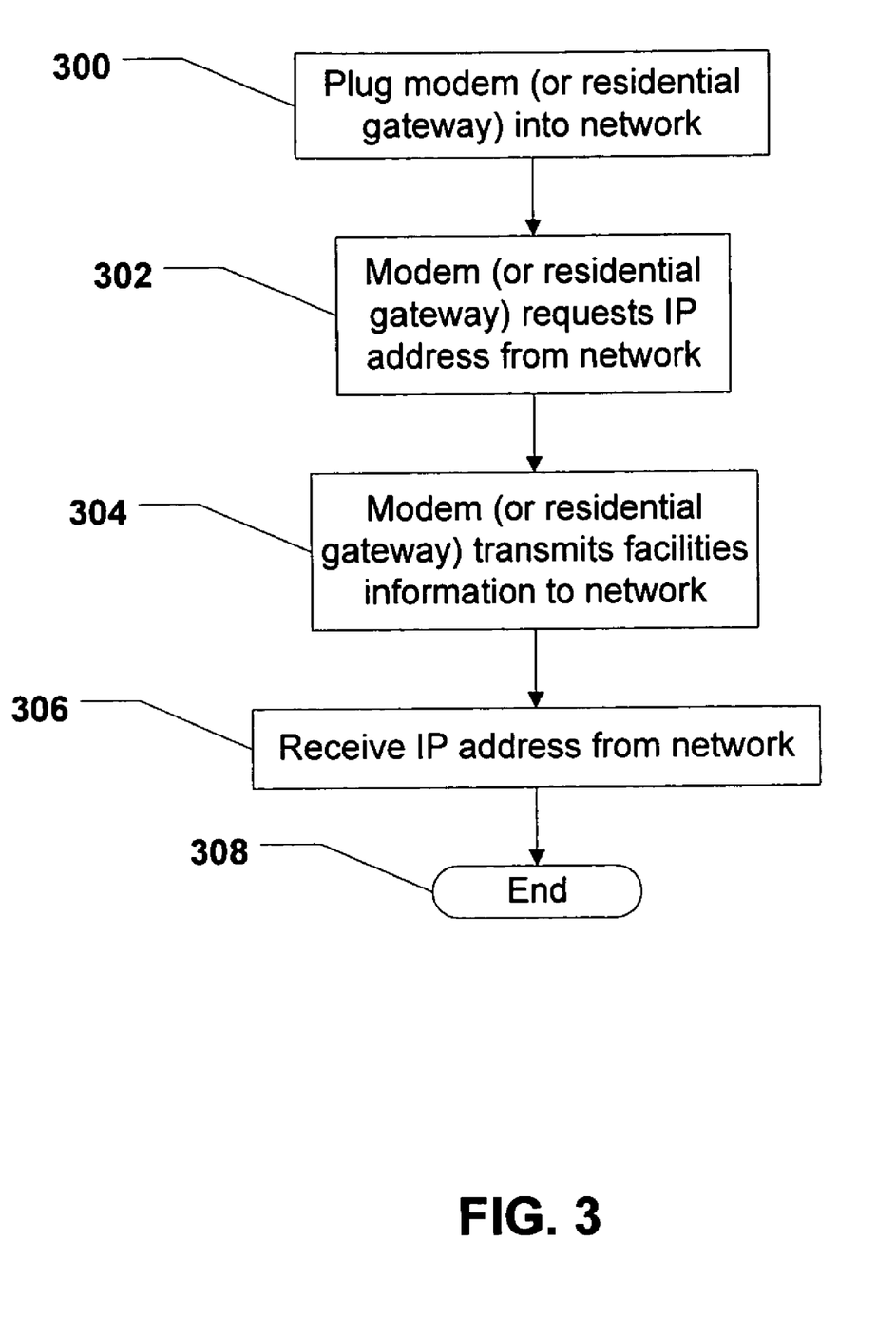
FIG. 3 is a flow chart that illustrates a method of associating a modem, or residential gateway, with a network.

FIG. 3 illustrates a method of associating a modem, or residential gateway, with a network. At block 300, the modem, or residential gateway, is plugged into the network. At block 302, the modem, or residential gateway, requests an Internet protocol (IP) address from the network. In a particular embodiment, the modem, or residential gateway, requests an IP address from the network using dynamic host configuration protocol (DHCP) Option 82. Moreover, at block 304, the modem, or residential gateway, transmits the facilities information to network. In a particular embodiment, the facilities information can include the DSLAM port address that is assigned to the customer. Further, in a particular embodiment, the request for the IP address can include the facilities information. At block 306, the modem, or residential gateway, receives an IP address from network. The method then ends at block 308.

Figure 4:
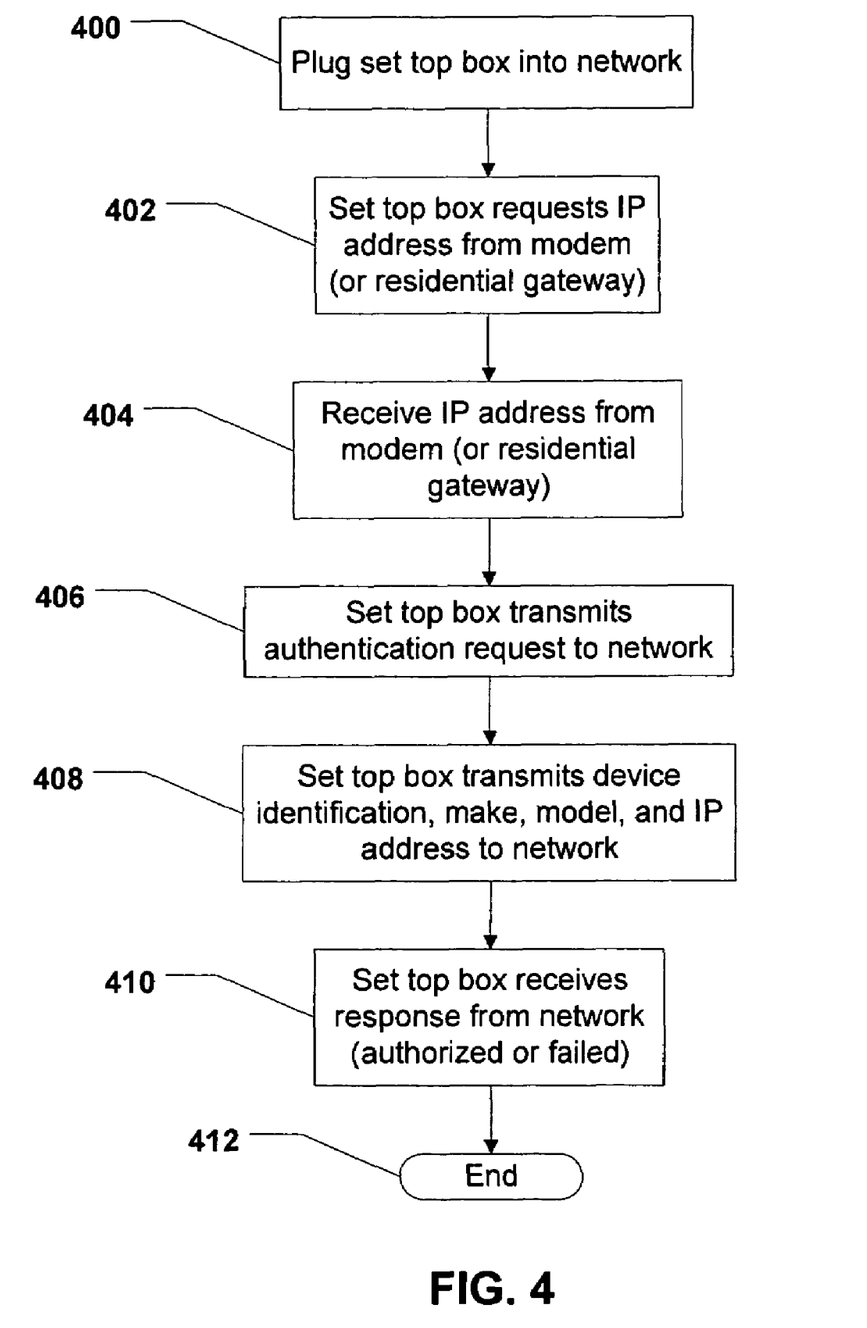
FIG. 4 is a flow chart that illustrates a method of associating a set top box with a network.

Referring to FIG. 4, a method of associating a set top box with a network is shown and begins at block 400. At block 400, the set top box is plugged into network, e.g., via a modem or a residential gateway. At block 402, the set top box requests an IP address from the modem, or the residential gateway. Proceeding to block 404, the set top box receives an IP address from the modem, or residential gateway. At block 406, the set top box transmits an authentication request to network. At block 408, the set top box transmits a device identification, make information, model information, and an IP address to the network.

In a particular embodiment, the authentication request can include the device identification, the make information, the model information, and the IP address. In a particular embodiment, the IP address that is transmitted to the network is the IP address of the modem, or residential gateway. The set top box has a local IP address that is assigned to it by the modem, or residential gateway. However, when the modem, or gateway, receives the request from the set top box it performs network address translation (NAT) on the set top box IP address so that the IP address within the request submitted to the network appears to the be the IP address of the residential gateway.

Moving to block 410, the set top box receives a response from the network. The response from the network can indicate that the set top box is authorized to receive for service or that the authorization attempt failed. The method ends at state 412.

Figure 5:
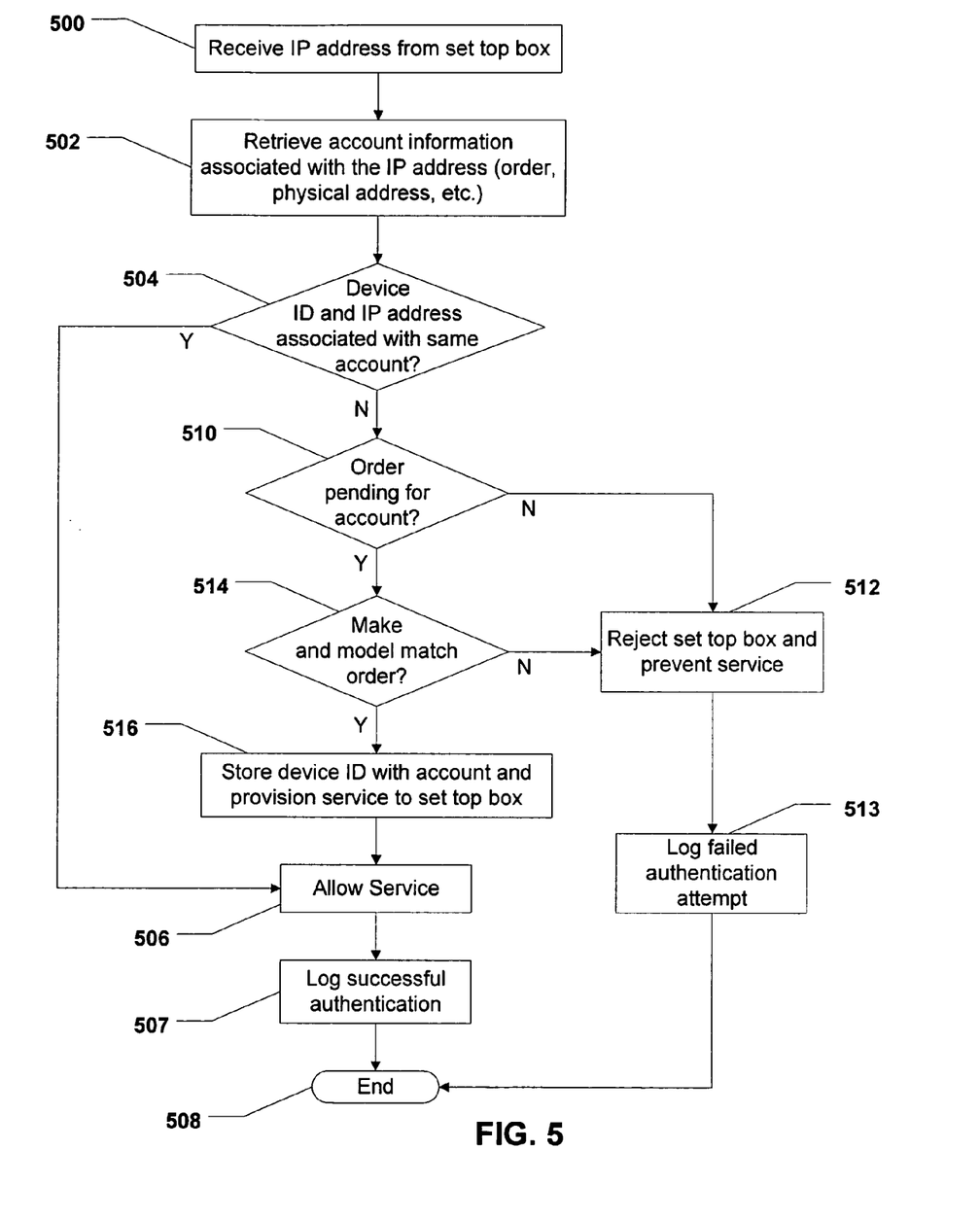
FIG. 5 is a flow chart that illustrates a method of authorizing a set top box.

FIG. 5 depicts a method of authorizing a set top box. At block 500, a service provider, receives an IP address and an identification from the set top box. At block 502, the service provider retrieves account information associated with the IP address. In a particular embodiment, the account information can include an account number, a service order, a physical address, etc.

Proceeding to decision step 504, the service provider determines whether the device ID and the IP address provided by the set top box are associated with the same account. If so, the method moves to block 506, and the service provider allows service to the set top box device. At block 507, the service provider logs a successful authentication associated with the set top box device. The method then ends at state 508. If the device ID and the IP address are not associated with the same account, the method moves to decision step 510 and the service provider determines whether an order is pending for the account associated with the IP address. If not, the method proceeds to block 512 and the service provider rejects the set top box and prevent service to the set top box. The method then ends at state 508.

Returning to decision step 510, if an order is pending for the account, the method continues to decision step 514 and the service provider determines whether the make and model of the set top box match the order submitted by the customer. In an illustrative embodiment, the make and model can indicate the capabilities of the set top box. The capabilities can include digital video recorder (DVR) capabilities, high-definition (HD) capabilities, standard-definition (SD) capabilities, and other capabilities. Accordingly, the service provider can determine whether the capabilities of the set top box match the capabilities associated with the order submitted by the customer. If the make and model do not match the order, the method moves to block 512 and the service provider rejects the set top box and prevents service to the set top box. At block 513, the service provider logs a failed authentication attempt associated with the set top box. Then, the method ends at state 508.

Conversely, at decision step 514, if the make and model of the set top box match, the method proceeds to block 516 and the service provider stores the device ID with the customer account and provisions service to set top box. Moving to block 506, the service provider allows service to the set top box. The method then ends at state 508.

In a particular embodiment, the steps described in conjunction with each method may be performed in one or more orders different from those shown in the FIGs. Further, one or more of the steps of each method can be performed by a computer, a server, or other processor device. Additionally, one or more of the methods described above may be performed in conjunction with a device other than a set top box. For example, one or more of the methods described above may be performed to authorize a voice over IP (VoIP) telephone at a customer location. In a particular embodiment, a VoIP telephone may be a standard telephone that is coupled to an analog telephone adapter (ATA) to allow the standard telephone to operate in a VoIP network. Alternatively, a VoIP telephone may include an ATA, or the functionality of an ATA, incorporated in the VoIP telephone. In another embodiment, one or more of the methods described above may be performed to authorize a modem, or residential gateway, that is used to access Internet services.

Figure 6:
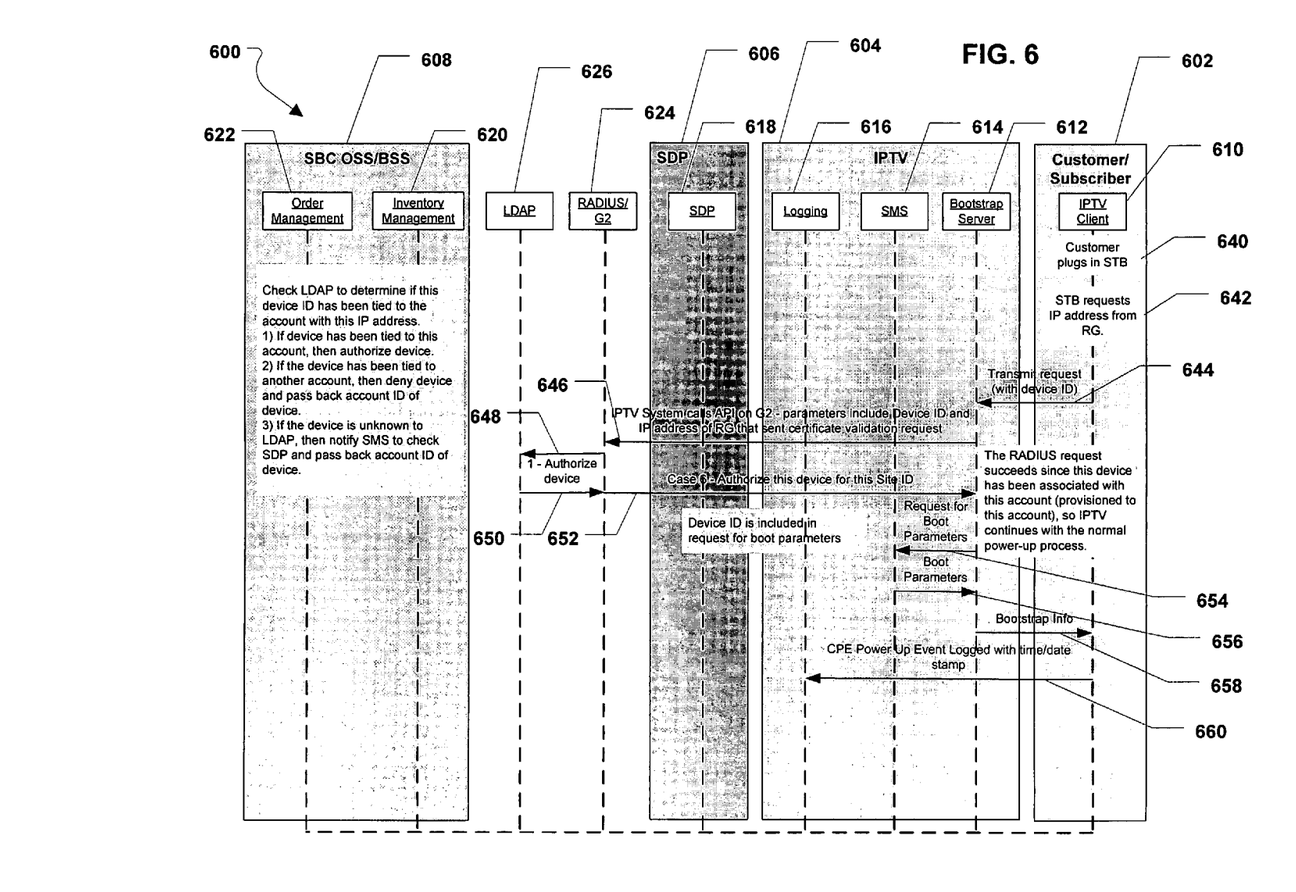
FIG. 6 is a ladder diagram that illustrates a method of authorizing a set top box device.

Referring to FIG. 6, a ladder diagram illustrating a method of authorizing a set top box device in an Internet protocol television (IPTV) environment is shown. As depicted in FIG. 6, the method is superimposed over an IPTV system that is generally designated 600. As shown in FIG. 6, the system 600 includes a customer or subscriber set top box device 602 that is coupled to an IPTV server 604. In a particular embodiment, the set top box device 602 is coupled to the IPTV server 604 via a residential gateway. The IPTV server 604 is coupled to a service delivery platform (SDP) subsystem 606 and an operation support system/business support system (OSS/BSS) server 608. In a particular embodiment, the SDP subsystem 606 can be part of the OSS/BSS server 608.

As shown in FIG. 6, the customer set top box device 602 includes an IPTV client module 610. The IPTV server 604 includes a bootstrap server 612, a subscriber management system (SMS) module 614, and a logging module 616 therein. FIG. 6 also shows that the SDP server 606 includes an SDP module 618 embedded therein. The OSS/BSS server 608 includes an inventory management module 620 and an order management module 622 embedded therein. Further, as illustrated in FIG. 6, the system 600 can include a radius/gatekeeper device 624 and a lightweight directory access protocol (LDAP) server 626.

The method shown in FIG. 6 commences at step 640 where the set top box device 602 is plugged in at the customer premises and connected to a broadband connection. The customer set top box device 602 can be connected by a customer or a local field office (LFO) technician. At step 642, the set top box device 602 requests an IP address from a residential gateway and the residential gateway assigns an IP address to the set top box device 602. In a particular embodiment, the set top box device 602 requests the IP address using dynamic host configuration protocol (DHCP). Moving to step 644, the set top box device 602 transmits a security certificate and a device identification to the bootstrap server 612 within the IPTV server 604 with an authorization request. In a particular embodiment, the security certificate complies with the cryptographic certificate exchange standard x.509.

At step 646, the bootstrap server 612 contacts the gatekeeper device 624 in order to authorize the set top box device 602. The bootstrap server 612 transmits the device identification and the IP address from which the security certificate was sent. Continuing to step 648, the gatekeeper device 624 contacts the LDAP server 626 in order to attempt to authorize the set top box device 602.

In a particular embodiment, the gatekeeper device 624 checks the LDAP server 626 to determine whether the set top box device 602 has been tied to an account with the present IP address. If the set top box device 602 is tied to the account with the present IP address, the method proceeds to step 650 and the LDAP server authorizes the set top box device 602. At step 652, the gatekeeper device 624 returns a message to the bootstrap server 612 that indicates that the set top box device 602 is authorized for the IP address and account.

Moving to step 654, the bootstrap server 612 sends a request for startup parameters to the SMS module 614. At step 656, the SMS module 614 returns the startup parameters to the bootstrap server 612. In a particular embodiment, the startup parameters can include account information associated with the set top box device 602. Further, the startup parameters can include a list of web service universal resource locators that can be accessed by the set top box device 602 to get information about digital video recorder (DVR) schedules, available channels, channel information, etc. Proceeding to step 658, the bootstrap server 612 transmits bootstrap information that includes the startup parameters to the set top box device 602. The set top box device 602 can use the startup information to locate channel line-up information, DVR schedule information, right to view information, etc.

Continuing to step 660, the set top box device 602 sends an indication of a power up event to the logging module 616 and the logging module 616 logs the power up event with a time and date stamp. In a particular embodiment, the power up event can indicate that the authorization of the set top box device 602 was successful. The method then ends.

Figure 7:
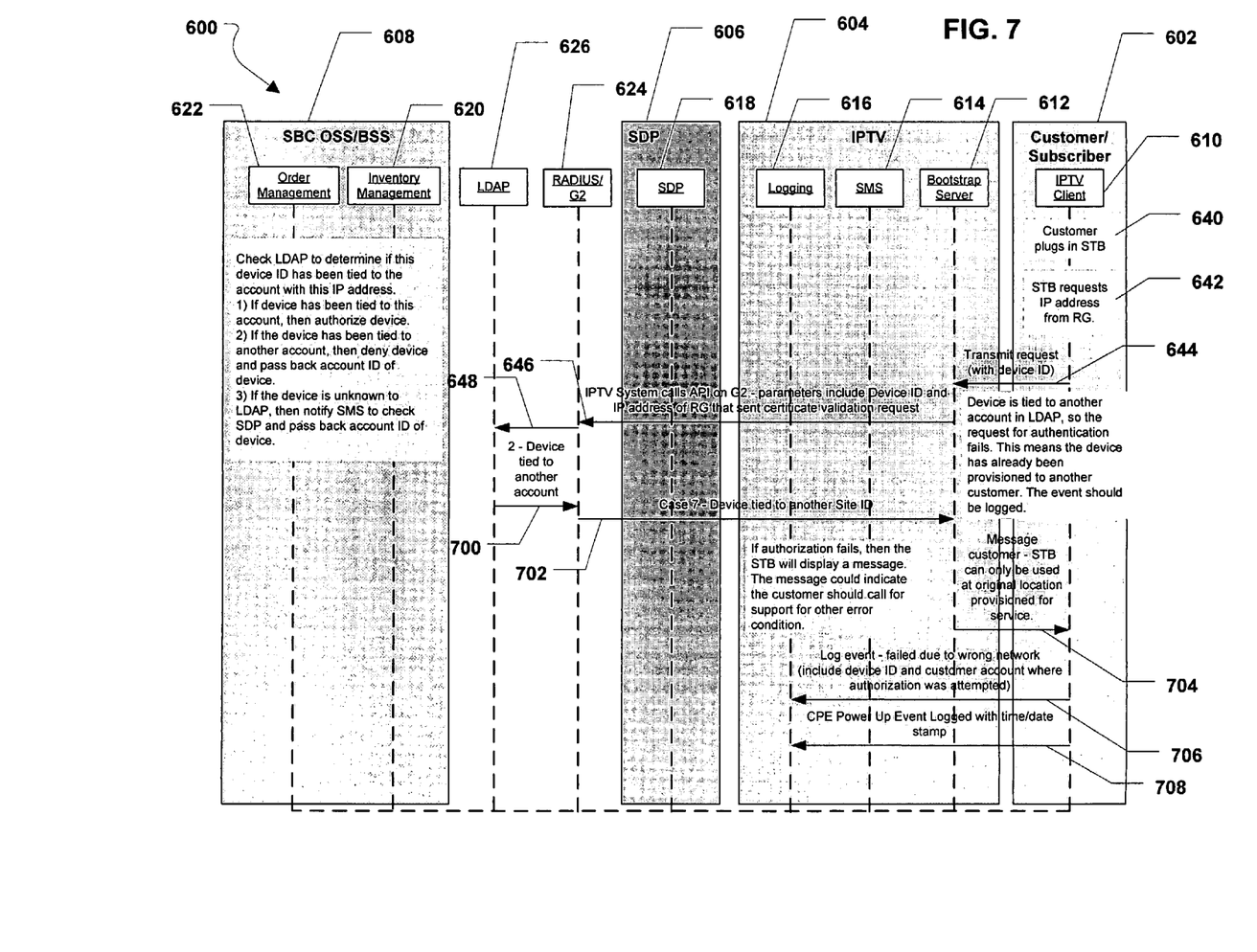
FIG. 7 is a ladder diagram that illustrates another method of authorizing a set top box device.

Referring to FIG. 7 and returning to step 648, if the set top box device 602 is tied to another account, the method proceeds to step 700 and the LDAP module denies authorizing the device and returns an account identification associated with the set top box device 602. At step 702, the gatekeeper device 624 transmits an indication to the bootstrap server 612 that the set top box device 602 is tied to another user site identification. Moving to step 704, the authentication fails and the bootstrap server 612 transmits a message to the customer that the set top box device 602 can only be used at the original location for which the set top box device 602 was provisioned for service. Additionally, the bootstrap server 612 can display a message that the customer can call customer support in order to try and mitigate the present authorization error.

Proceeding to step 706, the set top box device 602 transmits a log event to the logging module 616 that indicates that the authorization failed. The log event can include the set top box device identification and the customer account associated with the location from which the authorization was attempted. At step 708, the set top box device 602 sends an indication of a power up event to the logging module and the logging module 616 logs the power up event with a time and date stamp. Then, the method ends.

Figure 8:
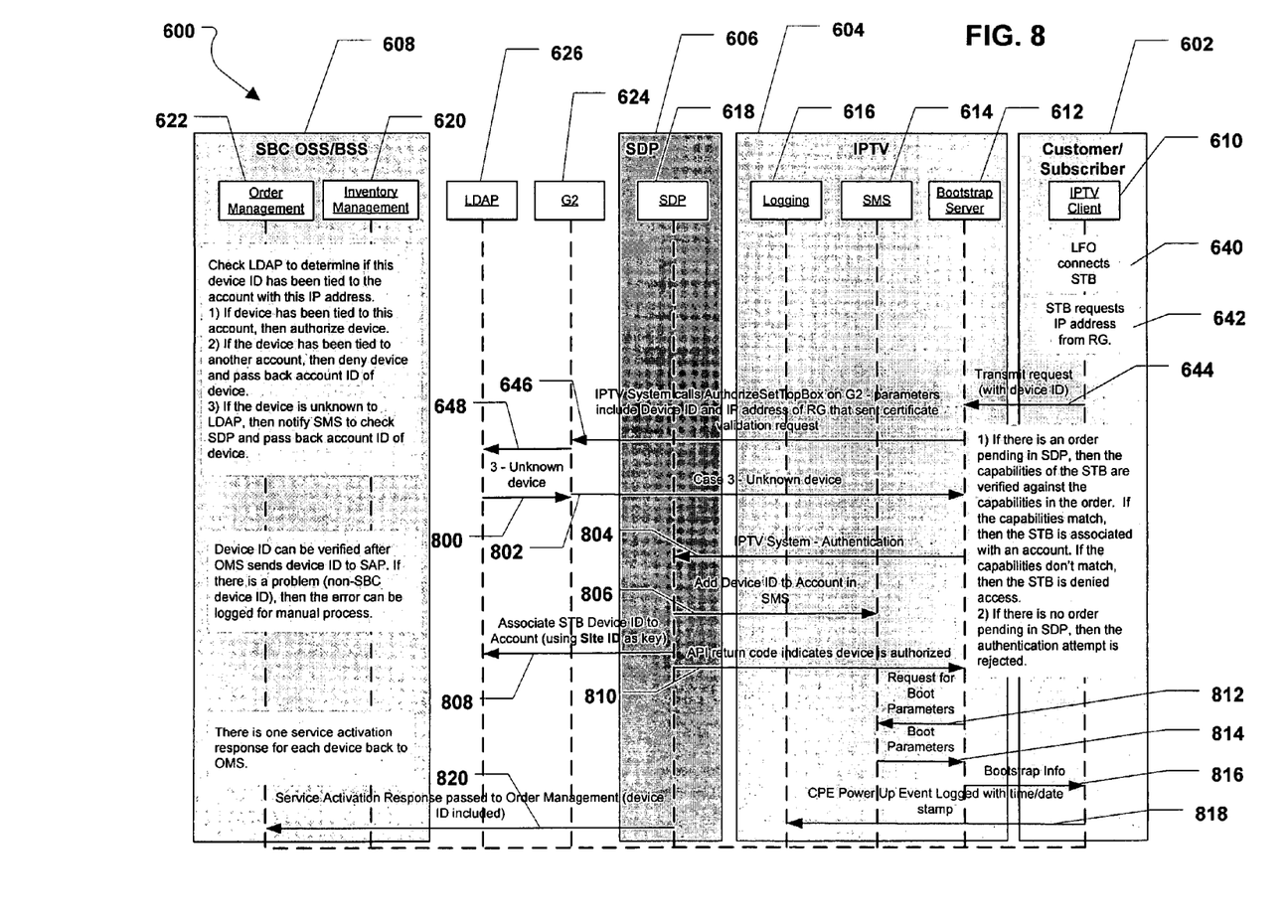
FIG. 8 is a ladder diagram that illustrate yet another method of authorizing a set top box device.

Referring to FIG. 8, and returning to step 648, if the device is unknown to the LDAP module 626, the method moves to step 800 and the LDAP module 626 notifies the gatekeeper device 624 to transmit an instruction to the bootstrap module 612 to check the SDP module 618 and passes back the location information associated with the set top box device 602 using the location information returned in step 802. At step 802, the gatekeeper device 624 returns a message to the bootstrap server 612 that the set top box device 602 is unknown. Moving to step 804, the bootstrap server 612 contacts the SDP module 618 to attempt to retrieve account information for the set top box device 602. In a particular embodiment, the bootstrap server 612 transmits the set top box device identification, the site identification from the residential gateway, the make of the set top box device 602, and the model of the set top box device 602.

In a particular embodiment, the SDP module 618 determines whether there is an order pending in the SDP module 618 for a set top box to be associated with the location from which the authorization is attempted. If there is an order pending, the capabilities of the set top box device 602 are verified against the capabilities associated with the pending order. For example, the capabilities can include a standard set top box, a set top box with an integrated digital video recorder, high definition television services, standard definition television service, etc. In another embodiment, the make of the set top box device 602, the model of the set top box 602, or both the make and model of the set top box 602 can be verified with the pending order. If the capabilities match, the set top box device 602 is associated with an IPTV account that was previously provisioned during an ordering process. As such, the set top box device 602 is allowed to access the channels that the customer previously ordered. If the capabilities do not match, the set top box device 602 is denied access and the denial event is logged by the logging module 616. Further, if the SDP module 618 does not find a pending order, the authentication attempt is rejected and the attempt is logged by the logging module 616.

Moving to step 806, the SDP module 618 adds the set top box device identification to the account in the SMS module 614. In a particular embodiment, the SDP module 618 uses an account identification associated with the customer account associated with a location in which the set top box device 602 is installed as an IPTV external identification. At step 808, the SDP module 618 contacts the LDAP server 626 to associate the set top box device identification to the user account using the site identification as a key. Proceeding to step 810, the SDP module 618 returns an indication to the bootstrap server 612 that the device is authorized.

At step 812, the bootstrap server 612 sends a request for startup parameters to the SMS module 614. At step 814, the SMS module 614 returns the startup parameters to the bootstrap server 612. In a particular embodiment, the startup parameters can include account information associated with the set top box device 602. Further, the startup parameters can include a list of web service universal resource locators that can be accessed by the set top box device 602 to get information about digital video recorder (DVR) schedules, available channels, channel information, etc. Proceeding to step 816, the bootstrap server 612 transmits bootstrap information that includes the startup parameters to the set top box device 602. The set top box device 602 can use the startup information to locate channel line-up information, DVR schedule information, right to view information, etc.

Continuing to step 818, the set top box device 602 sends an indication of a power up event to the logging module 616 and the logging module logs the power up event with a time and date stamp. In a particular embodiment, the power up event can indicate that the authorization of the set top box device 602 was successful. At step 820, the SDP module 618 passes a service activation response to the order management module 622 within the OSS/BSS server 608. The method then ends.

Figure 9:
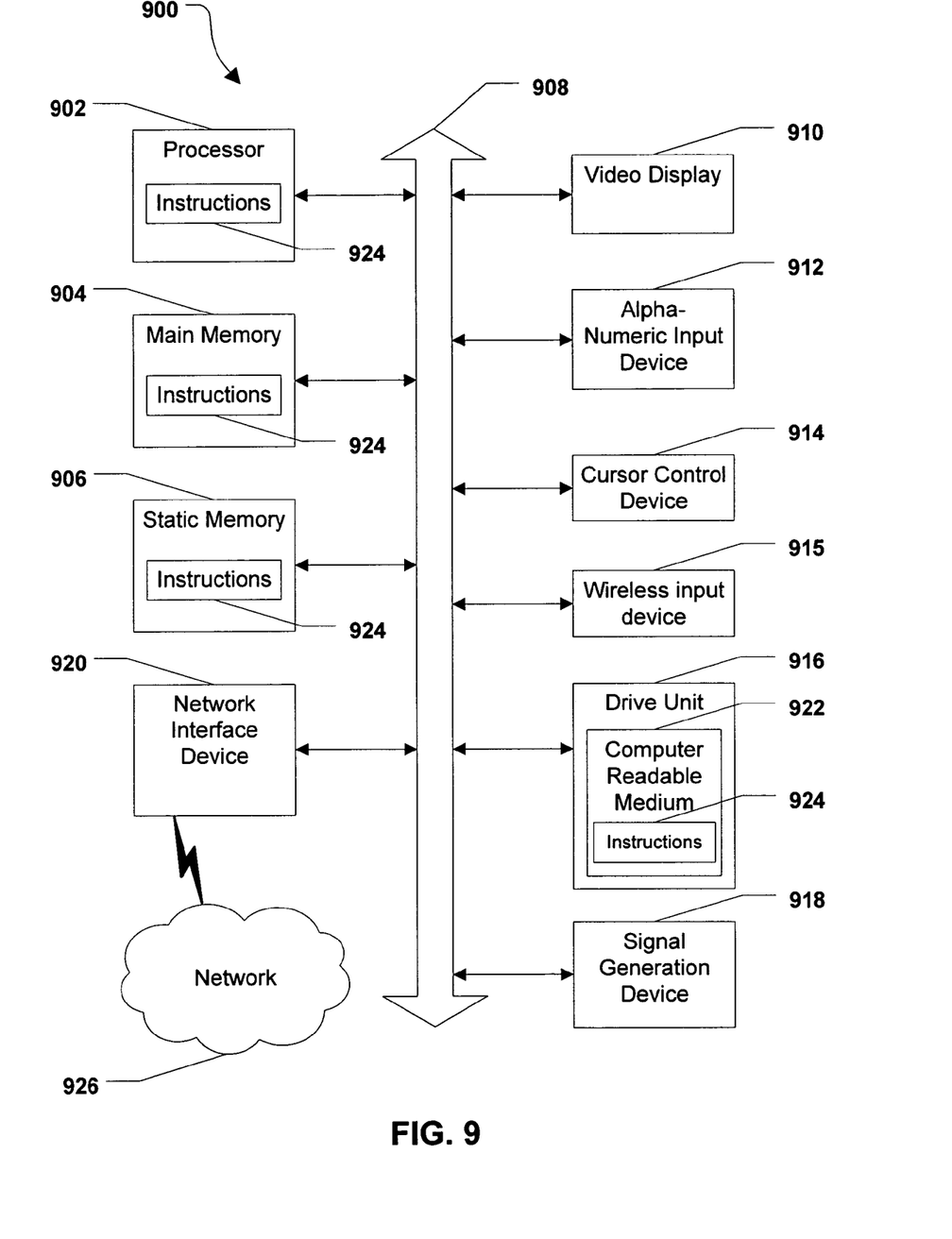
FIG. 9 is a block diagram that illustrates a general computer system.

Referring to FIG. 9, an illustrative embodiment of a general computer system is shown and is designated 900. The computer system 900 can include a set of instructions that can be executed to cause the computer system 900 to perform any one or more of the methods or computer based functions disclosed herein. The computer system 900 may operate as a standalone device or may be connected, e.g., using a network, to other computer systems or peripheral devices. In a particular embodiment, one or more of the system components illustrated in FIGS. 1 through 4 can include one or more of the elements described in conjunction with the computer system 900 depicted in FIG. 9.

In a networked deployment, the computer system may operate in the capacity of a server or as a client user computer in a server-client user network environment, or as a peer computer system in a peer-to-peer (or distributed) network environment. The computer system 900 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 900 can be implemented using electronic devices that provide voice, video or data communication. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 9, the computer system 900 may include a processor 902, e.g., a central processing unit (CPU), a graphics processing unit (GPU), or both. Moreover, the computer system 900 can include a main memory 904 and a static memory 906 that can communicate with each other via a bus 908. As shown, the computer system 900 may further include a video display unit 910, such as a liquid crystal display (LCD), an organic light emitting diode (OLED), a flat panel display, a solid state display, or a cathode ray tube (CRT). Additionally, the computer system 900 may include an input device 912, such as a keyboard, and a cursor control device 914, such as a mouse. Further, the computer system 900 can include a wireless input device 915, e.g., a remote control device. The computer system 900 can also include a disk drive unit 916, a signal generation device 918, such as a speaker or remote control, and a network interface device 920.

In a particular embodiment, as depicted in FIG. 9, the disk drive unit 916 may include a computer-readable medium 922 in which one or more sets of instructions 924, e.g. software, can be embedded. Further, the instructions 924 may embody one or more of the methods or logic as described herein. In a particular embodiment, the instructions 924 may reside completely, or at least partially, within the main memory 904, the static memory 906, and/or within the processor 902 during execution by the computer system 900. The main memory 904 and the processor 902 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 924 or receives and executes instructions 924 responsive to a propagated signal, so that a device connected to a network 926 can communicate voice, video or data over the network 926. Further, the instructions 924 may be transmitted or received over the network 926 via the network interface device 920.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

With the configuration of structure described above, the system and method of authorizing a set top box device in an IPTV system provides a way to mitigate errors and conditional states that can be associated with activating a network service, e.g., IPTV, VoIP, or other network service. For example, the system and method substantially ensures that a set top box device installed in a customer location will work with the IPTV system. Further, the system and method does not require that a set top box device is associated with, or allocated to, a customer service account prior to installation of the set top box device. The set top box device can be plugged in and authorized from the customer premises.

In the event of an initially defective set top box device, a technician can swap the defective set top box device with another functional set top box device without having to associate the functional set top box device with the user account prior to activating the set top box device. Also, a set top box device can be installed at any user location and then associated with the IPTV system.

Additionally, the system and method prevents a set top box from being provisioned for service at a first location, e.g. a house, and moved to a second location, e.g., a bar, where the broadcast of certain content, e.g., sporting events, may be regulated. As such, the system and method can be used to control the distribution and display of copyright protected content by only allowing certain copyright protected content to be displayed at authorized locations. Since a particular set top box can be tied to an account that is further tied to a physical address, the content provider can prevent copyright protected content from being displayed at a location other than the physical address tied to the account.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the devices and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of authorizing use of a network device, the method comprising:
   receiving, at a server of a network, an internet protocol (IP) address from the network device, wherein the received IP address indicates a location of the network device;
   receiving, at the server of the network, a device identification from the network device, wherein the device identification identifies a set top box coupled to the network device;
   retrieving information associated with an account based on the IP address;
   determining whether the IP address and the device identification are associated with a same account;
   allowing service to the network device after determining that the IP address and the device identification are associated with the same account; determining whether an order is pending for the account, after determining that the IP address and the device identification are not associated with the same account; determining whether a make and model of the set top box match an order for the account after determining that the order is pending for the account, wherein the make and model of the network device are determined at least partially based on the device identification received from the network device; blocking service to the set top box after determining that the make and model of the set top box do not match the order; and storing the device identification with the account and providing service to the set top box after determining that the make and model of the set top box match the order.

2. The method of claim 1, wherein the information associated with the account includes at least one of the following: an account number, an order, and a physical address.

3. The method of claim 1, wherein the network device is a set top box that is configured to receive television services.

4. The method of claim 1, wherein the network device is a Voice over IP telephone that is configured to receive telephone services.

5. The method of claim 1, wherein the network device is a residential gateway that is configured to receive Internet services.

6. The method of claim 1, further comprising transmitting a power up event to a remote logging module, wherein the power up event indicates that the network device is authorized and wherein the power up event is logged at a remote logging module with a time and date stamp.

7. A server, comprising:
   a memory accessible to a processor; and
   a computer program embedded within the memory, wherein the computer program includes:
      instructions to receive an internet protocol (IP) address from a network device, wherein the received IP address indicates a location of the network device;
      instructions to receive a device identification from the network device, wherein the device identification identifies a set top box coupled to the network device;
      instructions to retrieve information associated with an account based on the IP address;
      instructions to determine whether the IP address and the device identification are associated with a same account; and
      instructions to allow service to the network device after determining that the IP address and the device identification are associated with the same account;

instructions to determine whether an order is pending for the account after determining that the IP address and the device identification are not associated with the same account;

instructions to determine whether a make and model of the set top box match an order for the account after determining that the order is pending for the account;

instructions to block service to the set top box after determining that the make and model of the set top box do not match the order; and instructions to store the device identification with the account and to allow service to the set top box after determining that the make and model of the set top box match the order.

8. The method of claim 1, wherein the network device is a modem or a residential gateway.

9. The server of claim 7, wherein the network device is a modem or a residential gateway.

* * * * *